March 13, 1934.   H. F. PARKER ET AL   1,950,625
BRAKE
Filed May 21, 1930
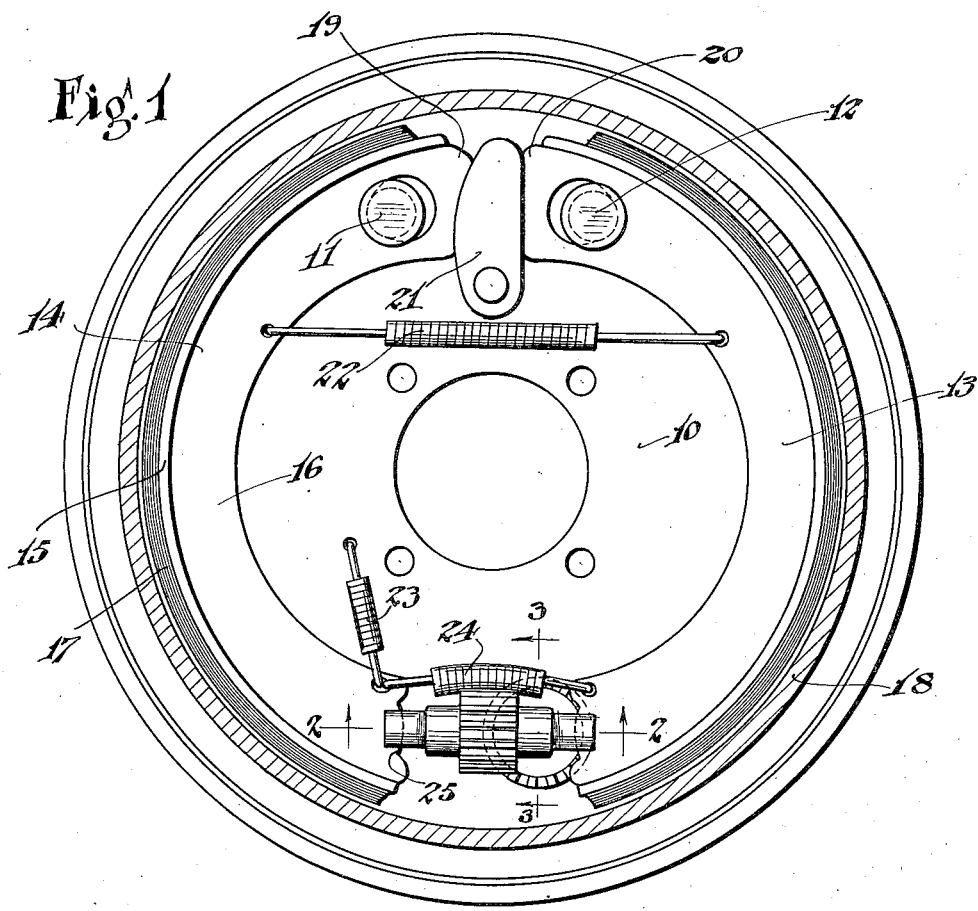
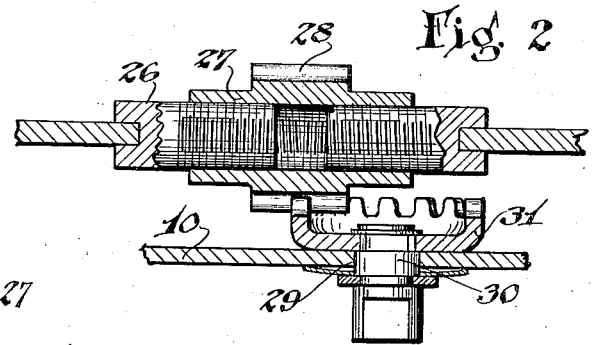
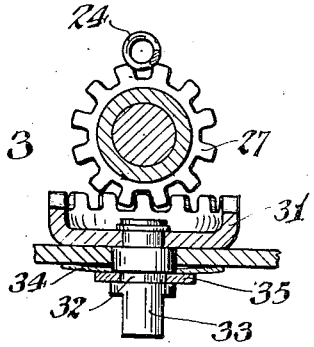
INVENTORS
Humphrey F. Parker
BY Bryan E. House
ATTORNEY Patented Mar. 13, 1934                                                1,950,625

UNITED STATES PATENT OFFICE 1,950,625

BRAKE

Humphrey F. Parker and Bryan E. House, South Bend, Ind., assignors to Bendix Brake Company, South Bend, Ind., a corporation of Illinois Application May 21, 1930, Serial No. 454,251

13 Claims. (Cl. 188—79.5)

This invention relates to brakes and more particularly to internal expanding brakes.

An object of the invention is to provide an adjustment means for the braking elements of an internal expanding brake mechanism.

Another object of the invention is to provide a brake mechanism having an adjustable means for regulating the position of the articulating ends of the braking elements with respect to each other.

Yet another object of the invention is to provide a brake having means for adjusting the braking elements readily accessible from outside of the brake.

A further object of the invention is to provide a brake mechanism having means for adjusting the braking elements thereof associated with a return means for the braking elements adapted to retain the adjusting means against displacement.

A still further object of the invention is to provide a brake mechanism having a plurality of braking elements and means associated therewith for adjusting the braking elements with relation to each other and means associated therewith including a return element for the braking elements adapted to retain the adjustable means against displacement, the return means and the adjusting means providing for lateral movement of the braking elements.

Other objects of the invention will appear from the following description taken in connection with the drawing, which forms a part of this specification, and in which:

Figure 1 is a side elevation of a brake embodying the invention;

Figure 2 is a sectional view substantially on line 2—2, Figure 1; and

Figure 3 is a sectional view substantially on line 3—3, Figure 1.

Referring to the drawing for more specific details of the invention, 10 represents a backing plate of a conventional type having means by which it may be secured to an axle housing or a spindle. As shown, the backing plate has positioned thereon suitable anchors 11 and 12 on which are positioned a primary shoe 13 and a secondary shoe 14. These shoes are of a conventional type and are each provided with a rim 15 and a web 16. The rim has suitably secured thereto a lining 17 adapted to engage a brake drum 18.

The articulating ends of the shoes are connected by an adjusting means to be hereinafter referred to, and the other ends of the shoes are provided with shoulders 19 and 20, between which is positioned a suitable operating cam 21 for spreading the shoes to engage the drum, and the shoes are connected by suitable springs 22, 23 and 24 for returning them to the off position.

The articulating ends of the respective shoes are notched as indicated at 25 to receive the bifurcated ends of an expansible member 26. The bifurcated members 26 are threaded in the opposite direction and are positioned in a turnbuckle 27 provided with a peripheral gear or pinion 28 having relatively wide teeth and normally held against rotation by the return spring 24 connected between the shoes 13 and 14. The spring 24 is positioned transversely of the plane of rotation of the turnbuckle and engages the teeth of the gear 28.

By rotation of the turnbuckle through the gear 28, the relative position of the articulating ends of the shoes may be readily adjusted. This adjustment is accomplished by means of a suitable crown gear positioned for rotation in the backing plate. As shown, the backing plate 10 is provided with an opening 29 in which a shaft 30 is positioned for rotation.

The shaft 30 has suitably secured on one end thereof a crown gear 31 in mesh with the pinion 28. The shaft is provided with a circumferential groove 32 and a headed portion 33 on the outer end thereof. A spring washer 34 of a concavo convex type is positioned on the shaft beneath a ring or retaining member 35 positioned in the groove 32. This retaining means effectively secures the shaft in position and functions as an anti-rattler.

It is to be observed that the relation of the crown gear 31 to the gear 28 on the turnbuckle 27 is such that the turnbuckle is free for lateral movement, so that application of the braking elements may be effected without in any way interfering with their relative adjustment, and that the return spring 24 functions as a pawl to prevent accidental rotation of the turnbuckle resulting in an undesirable condition.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. A brake comprising an expansible member, means connected therewith for expanding the member including a crown gear with respect to which the expansible member is arranged to float.

2. A brake comprising an expansible member including a gear, a crown gear meshing with the gear and with respect to which the gear is arranged to float and means outside of the brake for driving the crown gear.

3. A brake comprising a backing plate, a shaft positioned for rotation on the plate, a crown gear on one end of the shaft and engaging the inside of the backing plate and thereby serving to prevent axial shifting of the shaft in one direction, and means on the shaft engaging the outside of the backing plate for retaining the shaft against displacement in the other direction.

4. A brake comprising a pair of shoes, an expansible member connected between the shoes including a turnbuckle having a pinion and a return spring connected between the shoes engaging the pinion.

5. A brake comprising two braking elements, an expansible member connecting the braking elements, a return spring tensioned between the braking elements engaging the expansible member to retain the member in adjusted position and means for manipulating the expansible member accessible from outside of the break.

6. A brake comprising two braking elements, a turnbuckle connected between the braking elements and a return spring connected to and between the braking elements engaging the turnbuckle to prevent accidental displacement.

7. A brake comprising two braking elements, a turnbuckle connecting the elements, a pinion on the turnbuckle, a crown gear engaging the pinion and with respect to which the pinion is arranged to float, and means accessible from outside of the brake for actuating the crown gear.

8. A brake comprising a backing plate, two braking elements thereon, a turnbuckle connecting the elements, a pinion on the turnbuckle, a shaft positioned for rotation on the backing plate, a crown gear on the shaft engaging the pinion and with respect to which the pinion is arranged to float, and means accessible from outside of the brake for driving the shaft.

9. A brake comprising two braking elements having notches in their articulating ends, a turnbuckle having bifurcated members engaging the braking elements in the respective notches, a pinion on the turnbuckle having relatively wide teeth, a crown gear engaging the pinion affording lateral movement thereof, means accessible from outside of the brake for driving the crown gear and a return spring connected between the braking elements yieldingly retaining the pinion against displacement.

10. A brake comprising a backing plate, two braking elements positioned thereon, the articulating ends of the braking elements having notched portions, a turnbuckle having bifurcated members engaging the braking elements in the notches, a return spring connecting the braking elements and yieldingly retaining the pinion against rotation, a shaft positioned for rotation in the plate, a crown gear secured to one end of the shaft in mesh with the pinion, a head on the other end of the shaft accessible from outside of the backing plate and means for securing the shaft against displacement including a spring pressed washer.

11. A brake adjustment comprising a pinion member having elongated straight teeth, and an operating gear member having teeth meshing with the elongated teeth, one of said members being shiftable to float in the direction of the length of the elongated teeth, and the other one being held against such shifting while the teeth of the two members remain in mesh.

12. A brake adjustment comprising a pinion having elongated straight teeth, and an operating gear having teeth meshing with the elongated teeth, and which gear is mounted to permit rotation but to prevent shifting with said pinion, said pinion being shiftable to float in the direction of the length of the elongated teeth while said teeth remain in mesh.

13. A brake adjustment comprising two parts, one adapted to be connected between and to float with a pair of shoes, and the other being non-floating but remaining in operative engagement with the first member throughout its floating movements.

HUMPHREY F. PARKER.
B. E. HOUSE.